May 8, 1956  H. R. REYNOLDS  2,744,474
RAILWAY BEARING
Filed June 12, 1951  2 Sheets-Sheet 1
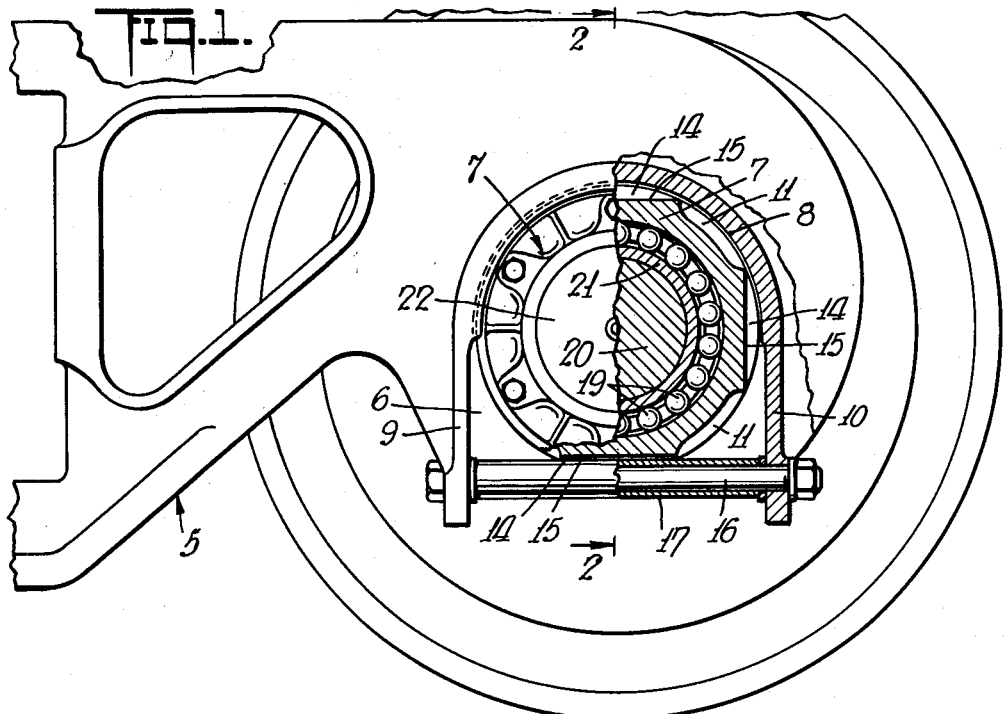
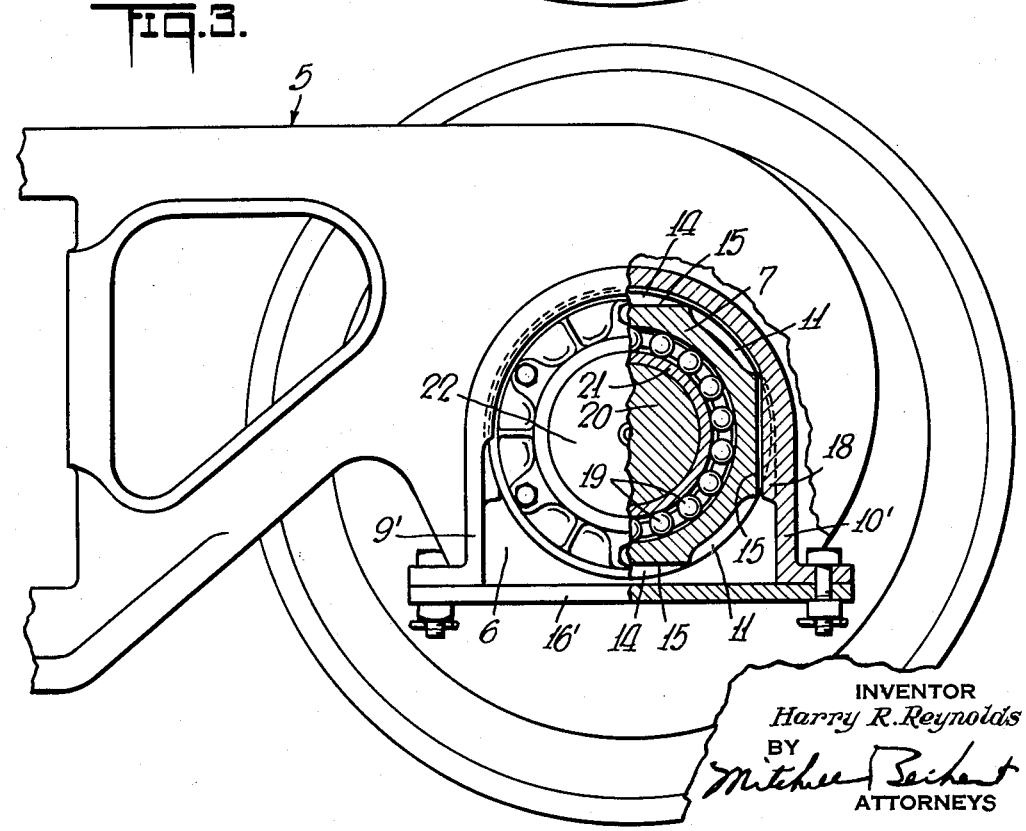
INVENTOR
Harry R. Reynolds
BY
Mitchell Bechert
ATTORNEYS

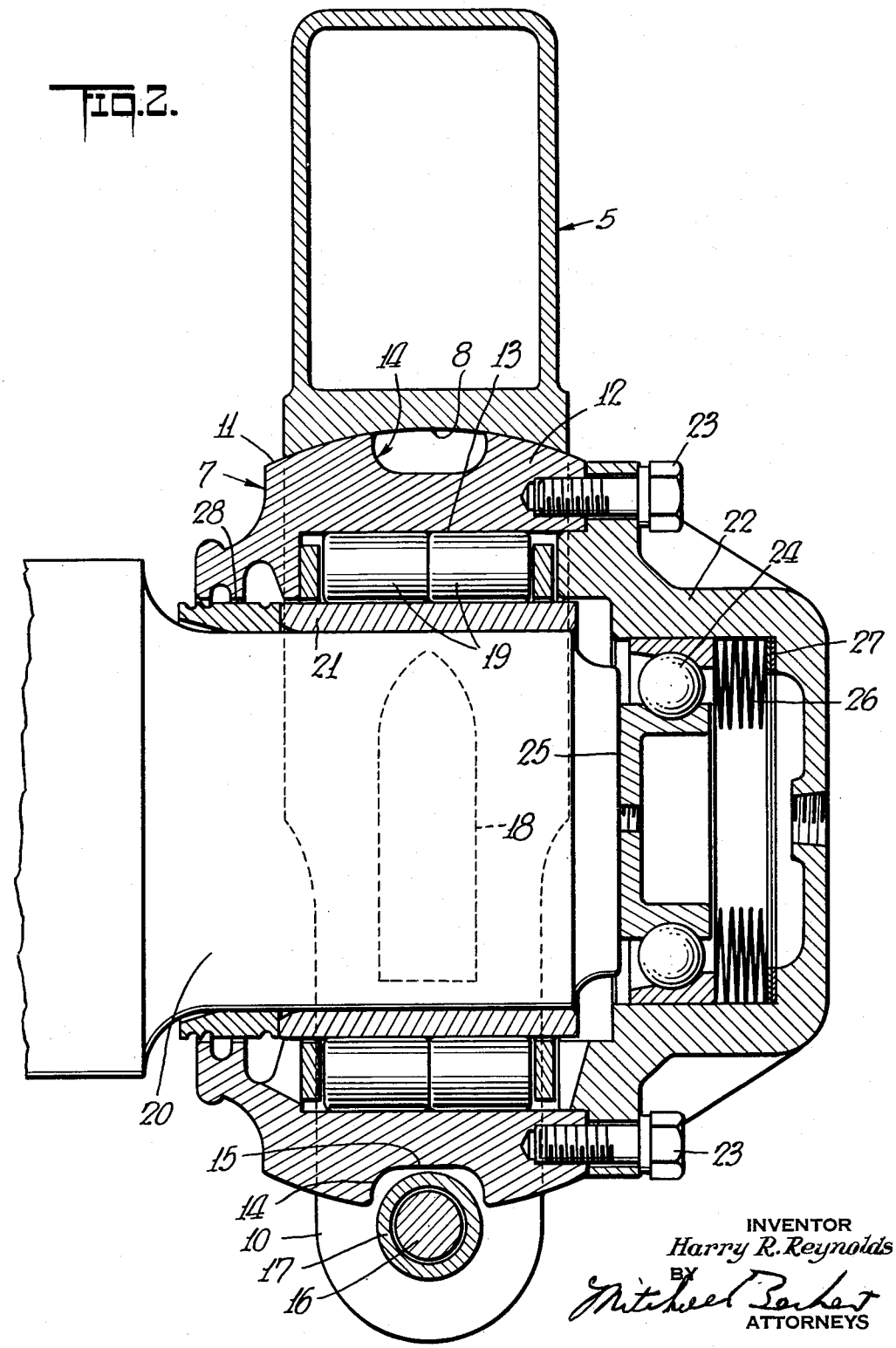

United States Patent Office 2,744,474
Patented May 8, 1956

2,744,474

RAILWAY BEARING

Harry R. Reynolds, New Britain, Conn., assignor to The Fafnir Bearing Company, New Britain, Conn., a corporation of Connecticut Application June 12, 1951, Serial No. 231,157

6 Claims. (Cl. 105—223)

My invention relates to a railway antifriction journal bearing.

The design restrictions put on antifriction bearings when applied to standard railway trucks often result in excessive and unnecessary loads on the antifriction bearings, thus tending toward failure or necessitating larger and heavier bearings than would ordinarily be justified by normal loads in railway use.

It is an object of my invention, therefore, to provide a railway antifriction journal bearing which tends to avoid the excessive and unnecessary loading referred to.

It is a more specific object to provide a railway antifriction journal bearing, which will permit and control the hunting action of the axle and wheels due to uneven track, curves and the like without undue strain on the bearing.

A more specific object is to provide an antifriction railway journal bearing which is completely self-aligning in the truck so as to take care of relative movements between the truck and the axle in all planes.

It is another object to provide an antifriction railway journal bearing, which may be self-aligned in the truck, with improved means for limiting the degree of self-alignment and preventing rotation of the bearing housing in the truck.

Another object is to provide an antifriction railway journal bearing, which is self-aligning in the truck and which embodies a cylindrical roller bearing for taking radial journal loads and a separate thrust bearing for taking axial loads.

It is another object to provide an antifriction railway journal bearing of such form that the housing may be shifted into a plurality of positions so as to bring new wear surfaces into position when load zone surfaces have become worn and thus greatly extend the life of the housing and the bearing in general.

A further object is to provide a bearing housing of the character indicated, which is substantially symmetrical, and of more or less uniform cross section to avoid cooling and internal stresses, and so as to make for cost reduction, and, in general, the object is to provide improved railway antifriction journal bearings.

In the drawings which show, for illustrative purposes only, preferred forms of railway trucks and bearing—

Fig. 1 is an end view in partial section of a journal bearing housing, assembled in a truck side frame or equalizing bar, and illustrating one form of the invention;

Fig. 2 is an enlarged vertical, central, sectional view, taken substantially in the plane of the line 2—2 of Fig. 1; and Fig. 3 is a view similar to Fig. 2, but illustrating a slightly modified form of side frame or equalizing bar construction.

In said drawings, 5 indicates part of a railway truck, which may be a side frame, equalizing bar, or other part, for receiving the journal bearing, and since the part of the truck may properly be described as the side frame, I employ that term generically to include not only side frames technically, but equalizer bars or other parts for receiving the antifriction journal bearing. The side frame illustrated in Figs. 1 and 2 includes a journal box recess 6 for receiving an antifriction bearing 7 therein. The recess 6, in the preferred form, has a surface 8 of about semi-circular extent at the top, which may have straight leg portions 9—10 forming substantial continuations of the semi-circular top portion, as will be clear. The semi-circular top seating portion of the side frame has the seating surface 8 of spherical form to receive the antifriction bearing housing 7, which has an outer bearing surface 11 of spherical form to fit the seat 8, and thus the housing may be self-aligned in its seat 8 while still maintaining an adequate and accurate seating surface. The housing 7 is preferably substantially symmetrical and includes a generally circular bearing housing 12, which has an antifriction roller bearing raceway 13 therein, and which surface may be a sleeve bearing for cylindrical rolls, or which may be constituted of the inner surface of the bearing housing itself.

In the preferred form, the journal bearing in general has means for limiting self-alignment of the bearing housing 12 in the side frame, and means for preventing rotation of the bearing housing in the side frame during normal operation. The means for preventing rotation and for preventing excessive misalignment may consist of interengaging parts between the housing 12 and the side frame.

The housing 12 may have a circumferentially extending groove 14 around the outside thereof and preferably located substantially centrally of the housing. The housing may have flats for engagement with corresponding surfaces on the truck side frame, and in the form shown, the bottom of the groove 14 has, at equally spaced intervals, flats 15 formed therein. In the illustrated form, there are four such flats equally spaced about the periphery.

The legs 9—10 of the frame are held together as by means of a tie-bolt 16, which may have a spacer sleeve 17 for preventing unnecessary strain on the parts, due to possible overstressing of the tie-bolt 16. The sleeve 17 in the form shown in Figs. 1 and 2 is positioned in the annular groove 14 and in position to contact the lowermost flat 15 in the bottom of the groove. Thus, when the parts are assembled, the housing 7 may freely self-align itself in the seat 8, but such self-alignment, as well as rotation of the housing about the axis of the journal, is limited by the sleeve 17, which may be contacted by opposite sides of the groove 14, and which may be contacted by the lowermost flat 15, as will be understood.

In the modification shown in Fig. 3, all of the parts heretofore described are substantially the same, except that instead of relying upon a tie-bolt 16 or spacer sleeve for preventing rotation and limiting self-alignment, I provide lugs on one part and interengaging surfaces on the other part to limit self-alignment and rotation. In the form illustrated, inside the recess 6 of the side frame, there are preferably two flat lugs 18 at opposite sides for engagement by the two opposite side flats 15—15 on the bearing housing. These lugs 18 are of a width to radially fit within the circumferential groove 14 and to permit the desired degree of self-alignment, and the lugs 18 are placed so as to be engageable by the flats 15 to limit housing rotation, and also to limit the degree of self-alignment. The legs 9'—10' in Fig. 3 may be held together, as by means of a tie-bar 16', which may be bolted to the bottom of the legs, as illustrated in Fig. 3. The tie-bar 16', therefore, serves merely as a means for preventing dislodgment of the bearing housing from the side frame in case of derailment or other accident, which might tend to lift the truck away from the axle bearing housing.

The cylindrical bearing rollers 19, which are interposed between the journal 20 and the housing 7, may roll upon a sleeve 21 fitting on the journal 20. The rollers 19—19 sustain only radial loads, and in order to prevent unlimited movement of the car journal axially in the bearings, I provide a thrust bearing. The bearing housing 7 at the outer side has a closure cap 22 secured thereto as by means of cap screws 23. A separate thrust bearing 24 is carried by the closure cap 22 and the thrust bearing preferably comprises a high angle contact ball bearing, and the inner ring projects substantially beyond the outer ring so as to contact the end of journal 20, as shown at 25. Spring means, such as Belleville springs 26, serve to constantly urge the entire bearing in the direction of the journal end so that there is always contact and the thrust bearing is maintained in rotation by the axle. The degree of pressure and the axial movement of the axle and wheels may be varied by adding or subtracting shims 27 behind the springs 26. The housing 7 and journal 20 are preferably sealed as by any suitable seal means 28.

It will be seen that the improved antifriction railway bearing provides for substantial misalignment and skewing of the axle and journal 20 relatively to the side frame. Such misalignment or skewing is usually due to unevenness in the tracks, the inherent movement or give of the side frame, and other causes. In the cylindrical roller bearing journals of the prior art, the bearing housings have been held quite securely, and any axial misalignments put excessive loads on the bearing rollers and thus tended toward failure or necessitated rolls much larger than necessary. In my improved bearing, which permits substantial skewing or self-alignment of the axle, the bearing housing 7 and all associated parts move with the axle and yet maintain the same adequate and proper seating surface in the cylindrical surface 8 of the side frame. Thus, undue strains are prevented and the bearing may thus be made lighter without any sacrifice of safety.

Since the pressure between the axle and the side frame is always in a vertical direction, the wear comes in the top of the bearing housing 7. My improved housing 7 is substantially symmetrical, and before wear has done any damage, it is preferable to raise the truck and rotate the bearing housing 7 to any one of the three remaining positions (where it will be held) so as to provide a new bearing zone at the top of the housing 7. Thus, the life of the entire bearing may be substantially prolonged. The substantially symmetrical housing 7 is relatively cheap to manufacture in that it is symmetrical about the journal axis and most of the operations are turning or similar operations.

All of the advantages of antifriction bearings for taking both radial and end thrusts are provided in my improved antifriction bearing journal box, and due to the limited self-alignment the excessive loading heretofore sometimes imposed on anti-friction bearings in railway use have been reduced.

While the invention has been described in considerable detail and preferred forms illustrated, it is to be understood that various changes may be made within the scope of the invention as defined in the appended claims.

I claim:

1. In a railway antifriction journal bearing, a bearing housing for receiving a journal and antifriction bearing members between the journal and housing, said housing having a generally spherical outer surface to fit a complementary seat on part of a railway truck, said housing having a generally circumferentially extending central groove in the outer spherical surface thereof for receiving means to limit self-alignment of the housing.

2. In a railway antifriction journal bearing, a bearing housing for receiving a journal and antifriction bearing members between the journal and housing, said housing having a generally spherical outer surface to fit a complementary seat on part of a railway truck, said housing having a generally circumferentially extending central groove in the outer spherical surface, said groove having a flat chordal surface forming the bottom of a part of said groove.

3. In a railway antifriction journal bearing, a truck side frame having a spherical seat surface of substantially semi-circular extent, a bearing housing to receive a journal and antifriction bearing members between the journal and housing, said housing having a spherical outer surface to be received in said seat surface, said housing having a circumferential groove in the outer surface thereof, the bottom of said groove at spaced apart points being defined by chordal flat surfaces, said side frame having projecting lugs to stand in said groove and engageable by said chordal flat surfaces.

4. In a railway antifriction journal bearing, a truck side frame having a spherical seat surface of substantially semi-circular extent in a circumferential direction, a bearing housing to receive a journal and antifriction bearing members between the journal and housing, said housing having a spherical outer surface to be received in said spherical seat surface, whereby said housing may be self-aligned in its seat, said bearing housing having an external circumferentially extending groove therein, said side frame having downwardly projecting legs from said seat portion, and horizontal means secured to and extending between said legs and engaging a part of said groove to limit self-alignment of said housing in its seat.

5. In a railway antifriction journal bearing, a truck side frame having a spherical seat surface of substantially semi-circular extent in a circumferential direction, a bearing housing to receive a journal and antifriction bearing members between said journal and housing, said housing having a spherical outer surface to be received in said seat surface, whereby said housing may be self-aligned in said seat, means for limiting the degree of self-alignment of said housing in its seat, said means comprising a plurality of chordal flats on the outside of said housing and means on said side frame to engage at least one of said chordal flats when said housing is in any one of a plurality of axially rotated positions.

6. In a railway antifriction journal bearing, a truck side frame having a spherical seat surface of substantially semi-circular extent in a circumferential direction, a bearing housing to receive a journal and antifriction bearing members between the journal and housing, said housing having a spherical outer surface to be received in said seat surface, whereby said housing may be self-aligned in its seat, and means for limiting the degree of self-alignment of said housing in its seat, said means for limiting self-alignment of said housing in its seat comprising a chordal flat on the outside of said housing and a flat on said side frame to be engaged by said chordal flat.

References Cited in the file of this patent

UNITED STATES PATENTS

| | | |
|---|---|---|
| Re. 19,011 | Noser | Nov. 28, 1933 |
| 1,074,172 | Gragert | Sept. 30, 1913 |
| 1,370,377 | Stafford | Mar. 1, 1921 |
| 1,796,616 | O'Connor | Mar. 17, 1931 |
| 1,929,803 | Brittain | Oct. 10, 1933 |
| 1,988,339 | Shafer | Jan. 15, 1935 |
| 2,405,132 | Brittain | Aug. 6, 1946 |
| 2,418,398 | Cottrell | Apr. 1, 1947 |

FOREIGN PATENTS

| | | |
|---|---|---|
| 2,431 | Great Britain | 1902 |
| 29,871 | Australia | Oct. 29, 1930 |
| 90,828 | Germany | Dec. 13, 1895 |
| 657,556 | Germany | May 1, 1936 |
| 711,376 | France | Sept. 8, 1931 |